(12) United States Patent  
Helmer

(10) Patent No.: US 7,568,492 B1  
(45) Date of Patent: Aug. 4, 2009

(54) CUSTOM CAMOUFLAGE HUNTING BLIND

(76) Inventor: Marc A. Helmer, 252 Strangeway Ave., Lodi, WI (US) 53555

(*) Notice: Subject to any disclaimer, the term of this patent is extended or adjusted under 35 U.S.C. 154(b) by 0 days.

(21) Appl. No.: 11/972,975

(22) Filed: Jan. 11, 2008

(51) Int. Cl.  
*E04H 15/32* (2006.01)  
*A01M 31/00* (2006.01)

(52) U.S. Cl. ............... 135/117; 135/115; 135/901; 43/1; 428/195.1; 428/919; 430/396

(58) Field of Classification Search ........... 135/115, 135/117, 119, 901; 43/1–3; 2/69, 900; 109/49.5; 428/16–17, 919, 195.1; 430/396  
See application file for complete search history.

(56) References Cited

U.S. PATENT DOCUMENTS

| | | | | |
|---|---|---|---|---|
| 2,827,729 | A * | 3/1958 | Hoene | 43/1 |
| 4,473,087 | A * | 9/1984 | Cavender | 135/87 |
| 4,576,904 | A | 3/1986 | Anitole | |
| 5,062,234 | A * | 11/1991 | Green | 43/1 |
| 5,592,960 | A | 1/1997 | Williams | |
| 5,680,893 | A * | 10/1997 | Neer | 160/330 |
| 5,727,253 | A | 3/1998 | Wilkinson | |
| 5,924,131 | A | 7/1999 | Wilkinson | |
| 6,148,836 | A * | 11/2000 | Cananzey | 135/87 |
| 6,164,005 | A * | 12/2000 | Copeland | 43/1 |
| 6,202,666 | B1 | 3/2001 | Rehbein | |
| 6,296,005 | B1 * | 10/2001 | Williams et al. | 135/98 |
| 6,408,865 | B1 | 6/2002 | Bliss | |
| 6,434,877 | B1 | 8/2002 | Shelton | |
| 6,641,522 | B2 * | 11/2003 | August | 600/27 |
| 6,779,537 | B1 * | 8/2004 | Miller | 135/117 |
| 6,941,961 | B1 * | 9/2005 | Eastman, II | 135/121 |
| 7,100,626 | B2 | 9/2006 | Livacich | |
| 7,182,091 | B2 * | 2/2007 | Maddox | 135/90 |
| 2002/0069904 | A1 * | 6/2002 | Robinson | 135/87 |

* cited by examiner

*Primary Examiner*—Winnie Yip  
(74) *Attorney, Agent, or Firm*—Charles S. Sara, Esq.; DeWitt Ross & Stevens S.C.

(57) ABSTRACT

A realistic appearing camouflage hunting blind that incorporates a photographic image of a hunting location. The visual appearance of the hunting blind mimics the actual environment so that from a distance, the hunting blind blends into the environment and is virtually undetectable. A photograph of an actual hunting location, like a Wisconsin forest, is taken and uploaded to a computer. The photograph is edited and printed onto substrate materials. The substrate materials are assembled to form a completed hunting blind.

13 Claims, 5 Drawing Sheets

CUSTOM CAMOUFLAGE HUNTING BLIND

FIELD OF THE INVENTION

This invention relates to camouflage equipment. Specifically, the invention relates to hunting blinds used to disguise a hunter in the outdoors. More specifically, this invention relates to a hunting blind with a custom-made exterior that visually matches the surrounding environment. As used herein, the term "environment" is meant to include any setting in which the blind of the present invention is used. While a rural setting, such as a woodland or forest is typically contemplated if the blind is used for hunting purposes, it is within the scope of the present invention to set the environment in an urban setting or even inside the building depending on the needs of the user.

DESCRIPTION OF THE PRIOR ART

Hunters wait quietly and patiently while sitting, squatting or standing on the ground, or in a tree, for their prey. However, such prey often has very keen senses, e.g., sharp eyesight and hearing. Therefore, the slightest movement by the hunter can be detected by the prey causing the prey to run.

In order for the hunters to blend with the environment, hunters hide themselves with camouflaged clothing and other surroundings so they stay undetected by their prey. However, camouflaged clothing oftentimes is insufficient because the hunter's movements are not camouflaged. Therefore, in some instances, hunters use other devices with a camouflaged exterior to hide themselves and their movements while quietly and patiently waiting for their prey. These devices are colloquially deemed hunting blinds.

Hunting blinds can be designed for use in almost any suitable environment such as thick forests, open fields, swamps, and even in tree limbs. Since hunters often walk great distances into the woods and move from one tree to another, it is highly desirable that the hunting blind is easily collapsible and portable. Hunting blinds also should be structurally and mechanically simple. In other words, the hunting blind should minimize the frame support structure used to support the camouflage fabric. See for example, U.S. Pat. Nos. 6,408,865; 6,434,877; and 7,100,626. Some of these hunting blinds mention the use of camouflage, but they do not address the improvement of the visual design of the camouflage and hunting blind.

The structure and design of a hunting blind is secondary to the visual appearance of the blind. No matter how easy it is to transport and set up, the hunting blind is virtually useless if the prey can detect it and become wary of it. The camouflage covering of the hunting blind becomes the single most important feature of effective blinds. For a hunter to effectively remain unnoticed by the prey, the hunting blind should blend into the environment as much as possible. Most commercial hunting blinds use a generic form of camouflage to mimic the hunting environment. For example, a hunting blind used for hunting in wooded environments will utilize either lush green colors for warmer seasons or muted browns for hunting in the fall. While the use of appropriately colored camouflage on hunting blinds may help it blend in, the blind will likely stand out in the environment.

Improving the methods for creating camouflage has been a field of interest for quite a while. Anitole, U.S. Pat. No. 4,576,904, addresses an improvement in the method for creating camouflage for military vehicles. Anitole describes using photographic and photo-optic methods to capture foliage and background images and a process for processing the images. The processed images yield high contrast patterns, which can be applied to vehicles used in a wide array of environments. This process is not suitable for a stationary hunting blind.

Williams, U.S. Pat. No. 5,592,960, describes a hunting blind with mirrored outer walls. This method for camouflaging the hunting blind will certainly reflect the exact environment, in which the blind is located. However, the mirrored walls will also reflect any movement made by an approaching animal and potentially scare it off. In another scenario, an animal may mistake his own reflection as another animal and decide to engage in a territorial battle.

Wilkinson, U.S. Pat. Nos. 5,727,253 and 5,924,131, describes a method for creating camouflaged clothing for hunters. Wilkinson describes using a photographic image of a typical scene at which a hunter may be positioned. The image is then edited and processed using complicated software so that it can be superimposed onto garments. The image is then printed on clothing patterns for an upper and lower garment and assembled according to size. This method is effective only for the hunter that is able to remain in a static position for long periods of time. Although the garment may match specific surroundings, whenever the hunter moves, the effectiveness of his camouflage is reduced.

Rehbein, U.S. Pat. No. 6,202,666, describes a photographic method for creating an outdoor tent with an internal image of a distant place. Rehbein uses panoramic images which are superimposed onto large surfaces and constructed to form a tent. The images must be carefully edited to fit in a parabolic assembly. The purpose of the tent design is to arrange a scene inside the tent, which represents a 360 degree view of an exotic locale. The tent is designed for an internal human observer and not to camouflage a person hunting in outdoor environments.

None of the prior art satisfactorily addresses the need for a specifically camouflaged hunting blind.

SUMMARY OF THE INVENTION

The present invention is a realistic appearing camouflage hunting blind and a method for customizing the camouflage blind. The camouflage hunting blind can be used in situations in which both the appearance and scale of a natural scene is advantageously mimicked or enhanced. The present invention is primarily directed to sporting purposes, such as hunting. However, the present invention can be used for military combat purposes or in other applications where concealment is desirable.

Referring to FIGS. 1 and 2, the present invention is specifically directed to a realistic appearing camouflage blind 12 comprising a substrate material comprising an image of a specific scene in an environment and means 19, such as stakes, ropes or carabiners, to support the blind. The image is preferably a photograph and more preferably an exact photograph of a specific scene in the environment. Alternatively, the image can be a stock or otherwise generic photograph. The blind can also include an aperture 24 through which a user can observe his prey.

The present invention is also directed to a method of making a custom camouflage blind 12, comprising taking a photograph of a specific scene in an environment, which scene is to be used on the blind, processing the photograph, transferring the photograph to a hunting blind substrate, and comparing the applied photograph to the scene in the environment.

Advantageously, the hunter can customize the camouflage on the hunting blind with an exact photograph of a hunting location. The hunter's photograph of the chosen scene is an accurate image of the natural scene, where one would typically hunt. For example, a Wisconsin forest scene may show a section of a tree trunk and associated branches, in substantially the same scale as the natural scene. The photographic scene is then imprinted onto a blind-building material so that when the hunting blind is constructed, the image on the material matches the environment.

The hunter can use one or more sheets of material to construct a hunting blind 12. The camouflage material can also be used on a 3-dimensional hunting blind with more than one side. If the hunter chooses to be camouflaged in more than one direction, such as from the sides or the top, the respective scene can be imprinted onto additional material. The additional material can be configured onto the hunting blind structure to cover the sides and top of the blind. When combined, all of the imprinted materials visually mimic the environment surrounding the hunting blind and the hunter will be camouflaged from multiple directions.

The preferred embodiment of the present invention includes a customizable scene which can be imprinted on any blind making material and incorporated into the hunting blind. If a hunter decides that the stock images do not match a particular environment, an exact image of a hunting location can be imprinted onto the material of their choice.

The customizable appearance of the hunting blind is a significant advantage of the present invention over prior hunting blinds. A hunting blind constructed as the present invention can be designed to exactly mimic a specifically chosen hunting location. If a hunter uses a specific hunting location regularly, the hunter can create a custom hunting blind that matches that location. The hunter need only take a photograph of the scene and that scene can be edited and imprinted on their material of choice and used to construct a hunting blind. Additionally, the hunter can take photographs of that scene in different seasons in order to construct numerous hunting blinds that can reflect foliage during annual seasons.

In another embodiment of this invention, a stock photographic image of an environment, where the hunting blind is intended to be placed, is chosen from a library of scenes. This stock image might reflect a generic scene, like a line of tree trunks, branches and/or leaves. This stock image would represent a generic location in which a person might hunt for any variety of wild game. This wooded image can have numerous variations depending on the density of the forest, etc. Another stock image can be a marsh, inclusive of plants native to marshes. The stock images are innumerably variable based on geographic locations and the yearly seasons.

The objects and advantages of the invention will appear more fully from the following detailed description of the preferred embodiment of the invention made in conjunction with the accompanying drawings.

BRIEF DESCRIPTION OF THE DRAWINGS AND ATTACHMENTS

DETAILED DESCRIPTION

The present invention is produced by printing a digital image onto a relatively flat surface for the purpose of creating a camouflage hunting blind.

Figure 1:
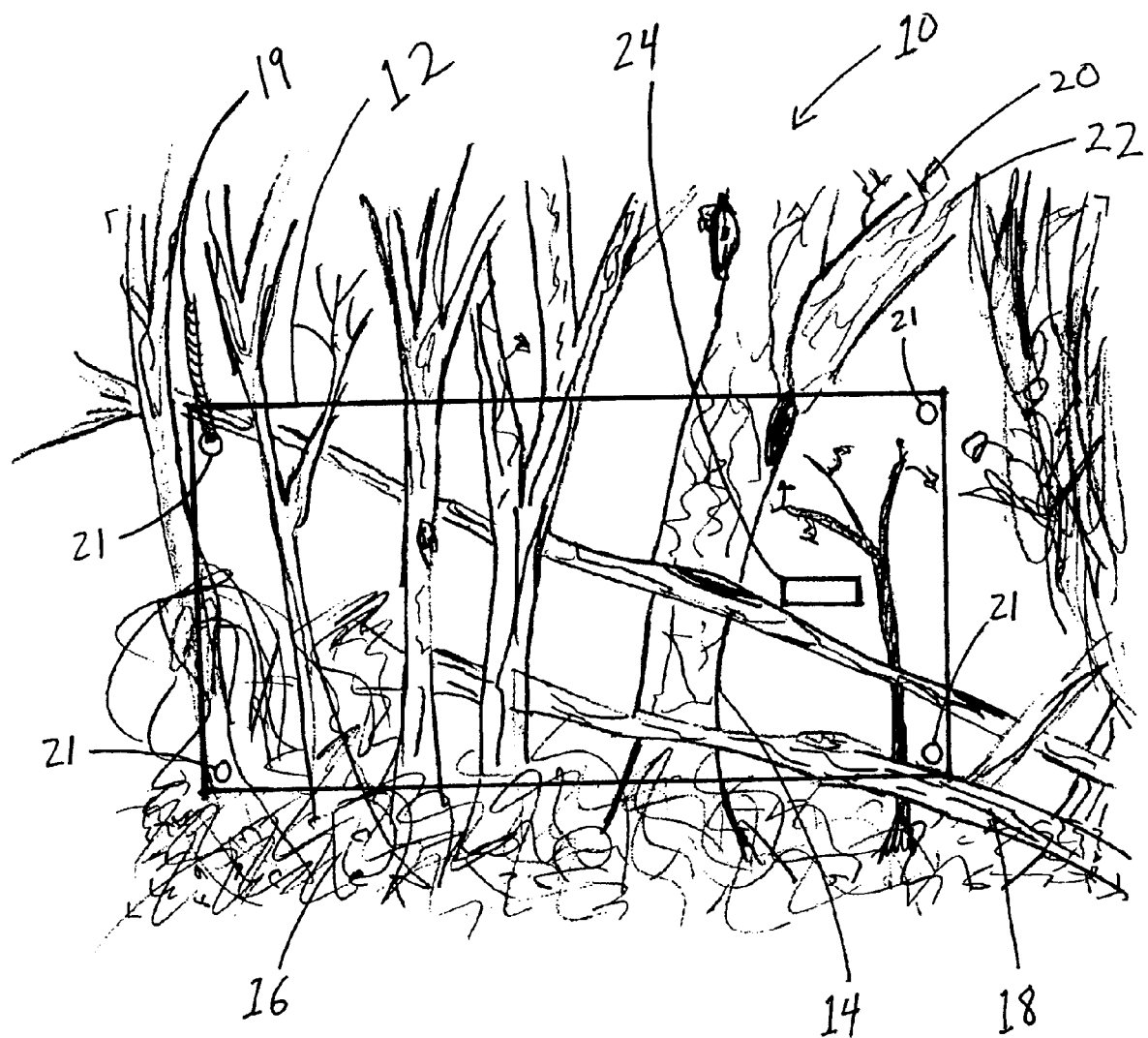
FIG. 1 is a drawn representation of a hunting blind, with custom camouflage, as it would be used in a hunting location.

FIG. 1 is a representative view 10 of an autumn scene overlaid by the camouflage hunting blind 12 of the present invention. Among other natural features, the view 10 includes a large tree trunk 14 in the center of the view 10, grass and detritus 16 and fallen trees 18 at the lower portion of the frame, and brown and red leaves 20 attached to branches 22 at the upper portion of the view 10. The view 10 is taken from such a distance so that the height of the scene within the view 10 is approximately 1:1 scale of the original scene. However, other photographic techniques may be used to create an appropriately scaled picture.

Figure 2:
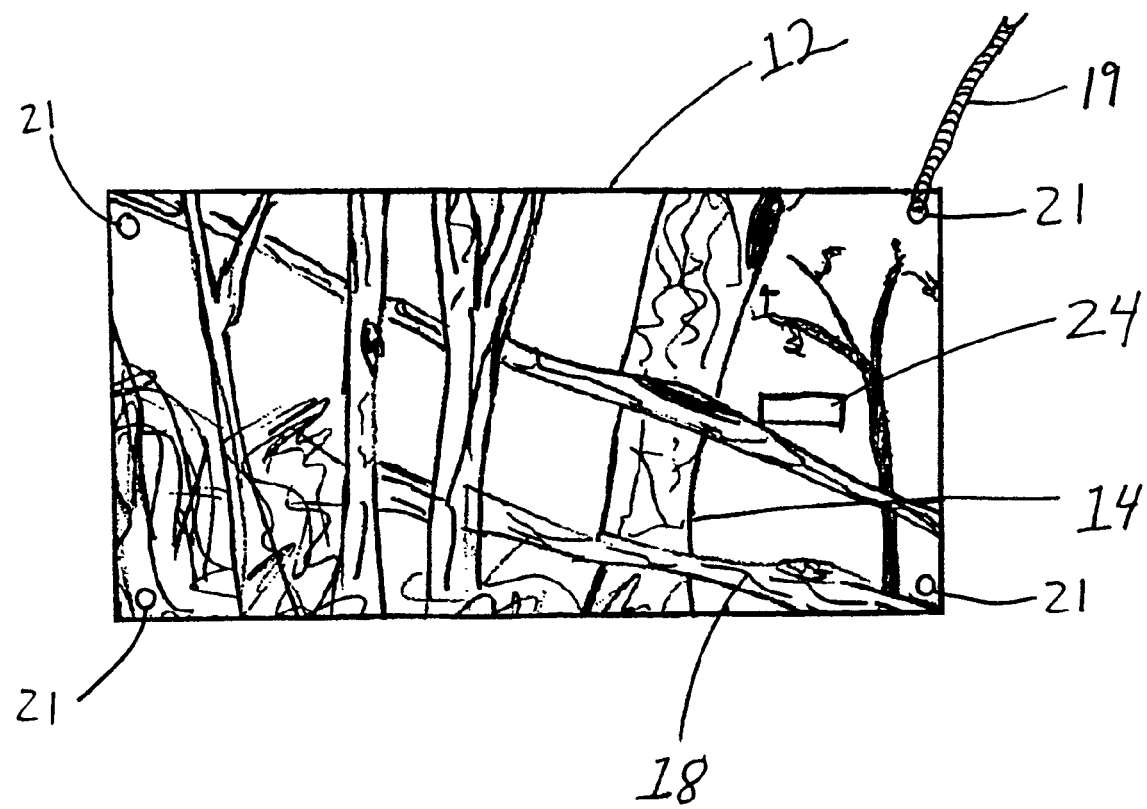
FIG. 2 is a drawn representation of the camouflage hunting blind of FIG. 1.

FIG. 2 depicts the camouflage hunting blind 12 apart from the environment. The hunting blind has a representative aperture 24 through which a hunter can observe animals. The hunter can also place his gun barrel through the aperture 24 to shoot. An arrow also can be shot through the aperture 24. Images of the tree trunk 14 and the fallen tree 18 are visible on the hunting blind 12.

Figure 3:
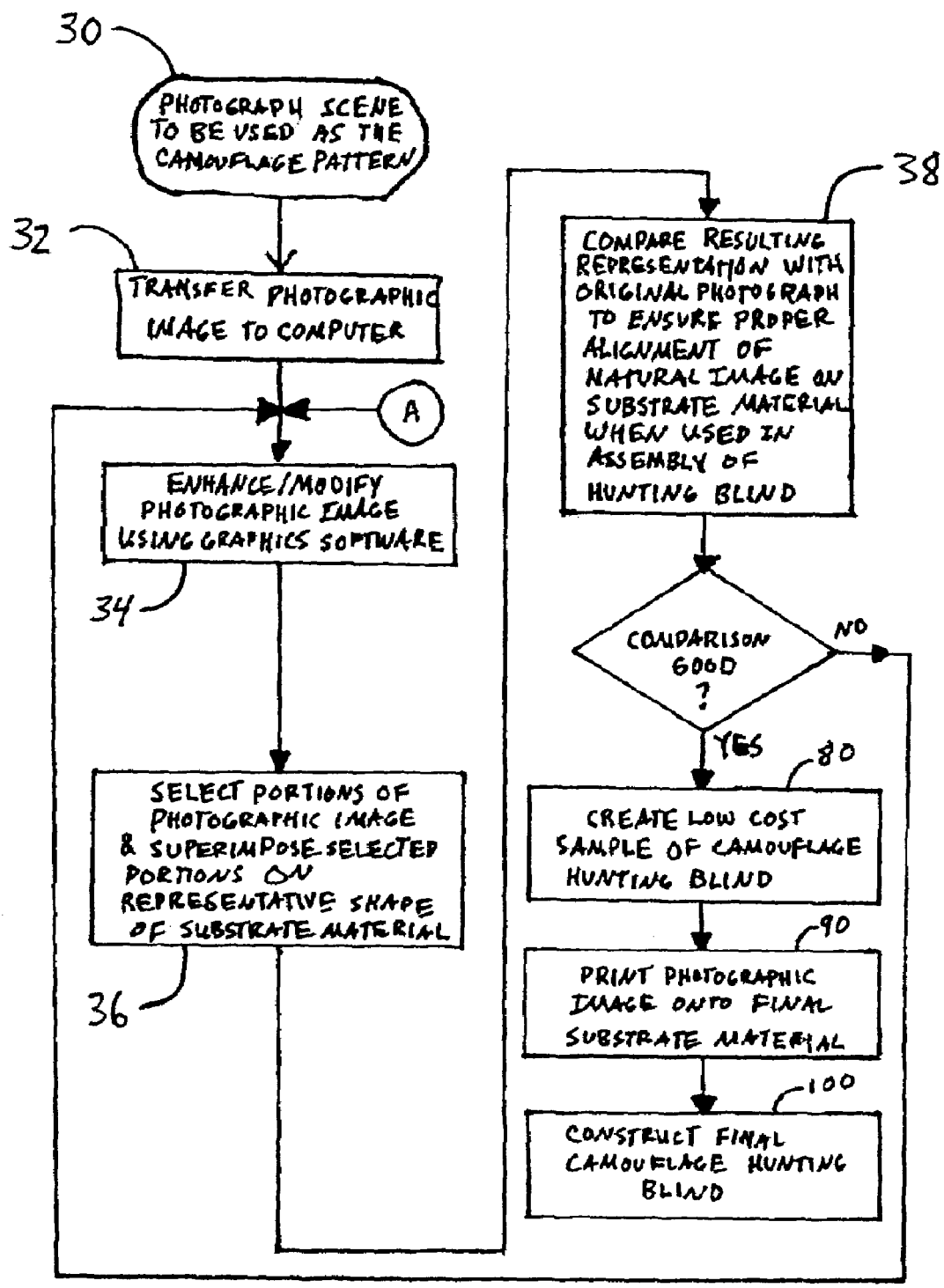
FIG. 3 is a flowchart depicting the overall process for creating a custom camouflage hunting blind in accordance with the present invention.

FIG. 3 illustrates the overall method used to design and create a camouflage hunting blind 12 in accordance with the present invention. Referring now to FIG. 3, the first phase of the technique is to take a color photograph 30 of a scene which includes natural objects which are to be used in creating the camouflage pattern for the camouflage system. In the preferred embodiment, the photograph will be of a scene from the area where the camouflage system is to be used, such as a forest in Wisconsin.

The digital images can be either standard "stock" images or custom images provided by the individual hunter. By using digital images of actual locations to create camouflage, the blind construction materials will have a much more realistic appearance, coloring, and depth, allowing the hunting blind to blend into each hunter's location. It is understood that the term photograph used throughout this specification refers to both a photograph taken with a traditional film camera, and a photograph taken with a digital camera, as well as a photograph or visual recording taken by any other means.

The digital image is preferably taken with a camera with 6-megapixel resolution or greater; however this is only a recommendation, as cameras with less resolution can be used. It follows that the greater the resolution, the better the image quality and resolution. For best results, the camera should be mounted on a tripod and multiple images taken, including one which contains a reference item to help scale the image.

Next, the view 10 of the scene is transferred to a personal computer system (PC) 32. The transfer may be achieved via a number of known methods, such as by scanning the hardcopy view 10, thereby translating the view 10 into a realistic digital representation of the view 10 which can then be manipulated by the PC, or by directly transferring a digital photograph taken by a digital camera.

Once the digital representation of the scene is resident on the PC, the digital representation may be manipulated by a graphics software program 34, such as PHOTOSHOP (Adobe Systems Incorporated, San Jose, Calif.) It is, of course, within the scope of the present invention to use other custom and off-the-shelf software programs. The graphics program can be used by an operator to enhance the lighting of the scene.

Lighting enhancements may take the form of removing inappropriate shadowing existing in the original view 10 or correcting for poor lighting conditions. The operator may, if necessary, also use the graphics program to manipulate elements within the digital representation. For example, the operator can crop portions of the image and superimpose the portions onto a digital representation of the shape of the final product, at box 36. After completing the digital representation, the user can compare it to a photograph of the scene, at box 38, to determine if the hunting blind 12 will be properly aligned with the natural elements, such as trees, etc.

Figure 4:
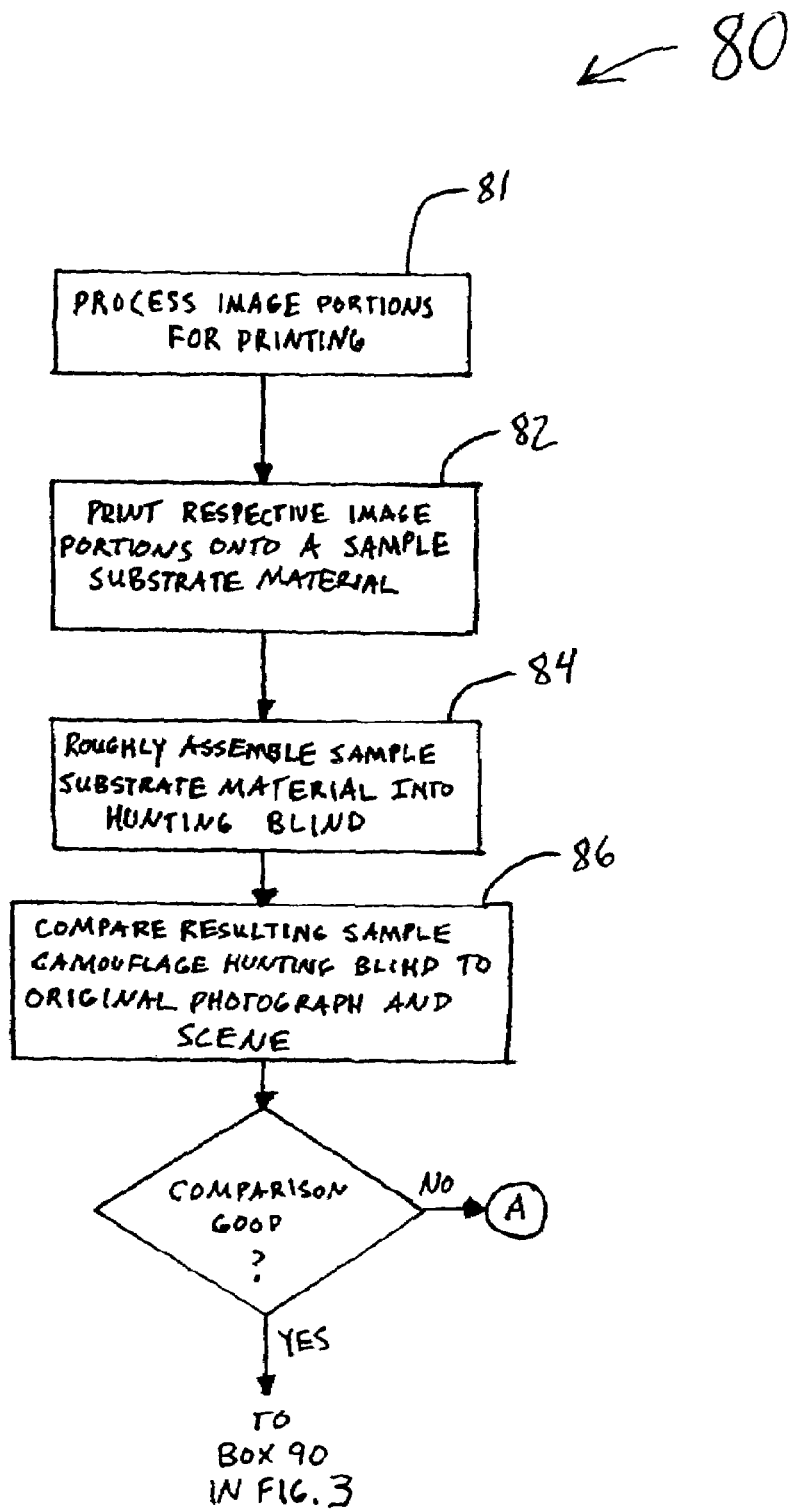
FIG. 4 is a flowchart of the submethod for creating a low cost sample of the custom camouflage used in accordance with the present invention.

A low cost and lower quality reproduction can be produced via submethod 80 to determine whether additional modifications need to be made. For example, as detailed in FIG. 4, the submethod 80 begins with the appropriate processing of the photographic image 81, as described in FIG. 3. Once the image has been processed, the photographed scene is applied to the substrate material at 82, which will comprise the camouflage hunting blind 12. At this step, the user will be able to determine if a branch within the photograph is in a strange position by quickly assembling the sample substrate material into the blind 12 at box 84 and comparing the resulting sample camouflage hunting blind 12 to the original photograph at box 86. If it appears that a branch should be graphically altered, the user can return to the computer program 34 (see FIG. 3) and move the branch to a different location on the hunting blind 12. The graphics program at 34 may also be used to perform color enhancement and balancing of the photograph. Thus, if the view 10 of the scene was taken in the fall, with the result that the leaves 20 within the view 10 are brown or red, but the camouflage hunting blind 1 is intended to be used in the spring, the color of the leaves 20 may be changed to green so as to more closely resemble spring foliage.

Figure 5:
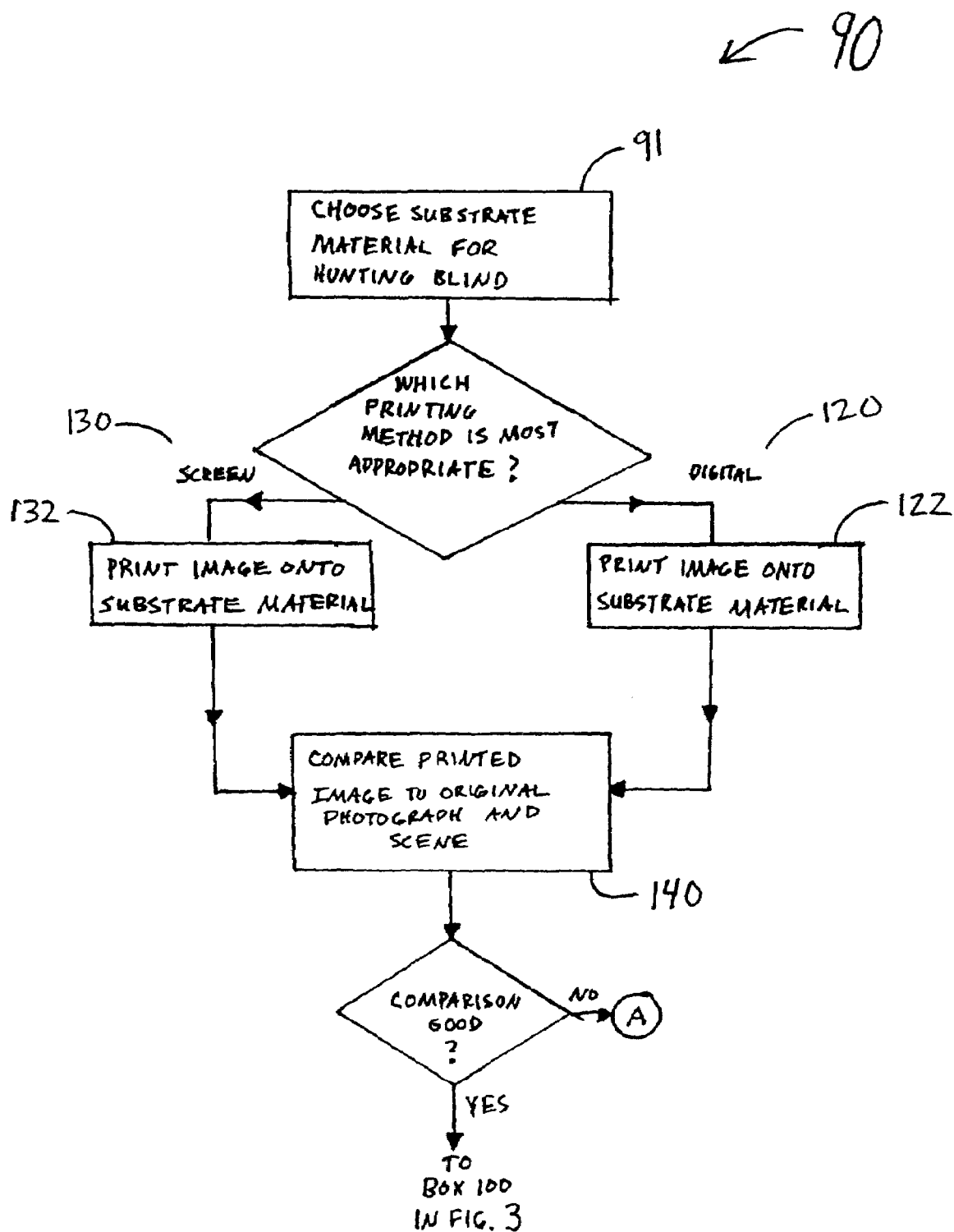
FIG. 5 is a flowchart of the submethod for choosing which printing process should be used to imprint the camouflage onto the substrate material.

Once the aforementioned manipulations have been completed, the resulting digital image of the actual scene is transferred onto the appropriate and final substrate material via submethod 90. FIG. 5 illustrates the process for printing the hunting blind 12. First, the user must determine, at box 91, the most appropriate substrate material for the final production of the hunting blind 12. The desired substrate material will have characteristics that make it suitable for use in a hunting blind 12. The portable hunting blind 12 of the present invention preferably requires substrate material that is flexible, light weight, and durable. A more permanent and stable hunting blind would use material with more rigidity. Examples of suitable substrate material include plastic sheets, cloth sheets, wood panels, or mesh sheets. Alternatively, the substrate can be made of less durable material such as paper or thin plastic. Such substrates may be desirable for one-time use or disposable hunting blinds 12.

The preferred methods for transferring the image are large-scale digital ultraviolet (UV) printing and/or solvent based ink printing at box 120 (FIG. 5). These methods utilize inkjet style printer heads but with specialized ink. UV reactive ink polymerizes from a liquid to a solid upon exposure to ultraviolet light. Solvent based inks are cured with heat. Both provide a durable, weather resistant surface which will stand up to the harsh conditions encountered in the field. These methods are suitable for printing large surfaces that require high volumes of ink at 122. The custom camouflage image can be printed and cured in a single process. Large-scale printers, UV-reactive and solvent-based ink are common in the printing arts.

Another method of transferring the image to the material is a four color screen printing process at 130. A four color process is used to ensure that the camouflaged hunting blind 12 is accurately and realistically colored. First, four color process separations are produced using the aforementioned graphics software. Each of the color separations are printed out onto a respective film, using a plotter, for example a GO dMax Color Separation Printer (Graphics One, Burbank, Calif.) The films are then rendered onto screens in the traditional manner. The screens are subsequently placed in a flat screen printer, such as one manufactured by Svecia (Stockholm, Sweden). The flat screen printer is then used to print production runs of sublistatic paper at 132. Next a rotary transfer press, such as one from Astro Technologies (Hampshire, England), is used to apply ink from each sublistatic paper to the substrate material.

The final printed image is compared to the original photograph at 140. If the results are satisfactory, a full production run can be made as illustrated in FIG. 3 by the submethod 100. If the results are not satisfactory, the process must be repeated as illustrated at A in FIGS. 3, 4 and 5. Additional physical modifications (not shown) may be made to the printed substrate material as it is incorporated into the hunting blind 12. For example, these manipulations may include the addition of grommets 21, illustrated in FIG. 1, in the corners and around the edges of the substrate material. Grommets 21 can provide points of attachment 19 at which the material can be attached to stakes or other support objects to hold the material to the desired shape of the hunting blind. The final product can then be used alone, or in conjunction with, other readily available hunting equipment to provide effective concealment for the hunter in a variety of applications. For example, the camouflage hunting blind may be assembled to rest flat on the ground. The hunting blind can also be assembled to perch in a tree. In any situation, the portions of the hunting blind that will be in the line of sight for prey can be camouflaged to match the scene. For a hunting blind in a tree, the bottom can be camouflaged with an image of an upward view of the tree.

It is understood that the invention is not confined to the particular construction and arrangement of parts herein illustrated and described, but embraces such modified forms thereof as come within the scope of the following claims.

I claim:

1. A camouflage hunting system comprising:
   a. a camouflage blind being disposed in an environment having an environmental scene;
   b. the camouflage blind comprising a substrate material having a photographic image of the environmental scene, wherein the photographic image on the substrate material provides substantial visual continuity with the environmental scene to substantially match and reflect the environment; and
   c. a support for supporting the substrate material of the blind in the environment.

2. The camouflage hunting system of claim 1 wherein the photographic image is an exact photographic image of the environmental scene.

3. The camouflage hunting system of claim 1 wherein the photographic image is a stock photographic image.

4. The camouflage hunting system of claim 1 further comprising an aperture in the substrate material through which a user can observe.

5. The camouflage hunting system of claim 1 wherein the substrate material is selected from the group consisting of plastic, cloth, paper, wood panels, and mesh sheets.

6. The camouflage hunting system of claim 1 further comprising grommets for supporting the blind in the environment.

7. The camouflage hunting system of claim 1 further comprising stakes or other support objects to hold the blind in a desired shape.

8. A camouflage hunting system comprising:
   a. a camouflage blind being disposed in an environment having an environmental scene;
   b. the camouflage blind comprising a substrate material having a custom photographic image of the environmental scene, wherein the custom photographic image on the substrate material provides substantial visual continuity with the environmental scene to substantially match and reflect the environment; and
   c. a support for supporting the substrate material of the blind in the environment.

9. The camouflage hunting system of claim 8 comprising a 3-dimensional hunting blind with more than one side.

10. The camouflage hunting system of claim 8 wherein the substrate material is selected from the group consisting of plastic, cloth, paper, wood panels, and mesh sheets.

11. The camouflage hunting system of claim 8 further comprising grommets for supporting the blind in the environment.

12. The camouflage hunting system of claim 8 further comprising stakes or other support objects to hold the blind in a desired shape.

13. The camouflage hunting system of claim 8 further comprising an aperture in the substrate material through which a user can observe.

* * * * *